United States Patent [19]

Fukuma et al.

[11] Patent Number: 5,167,211
[45] Date of Patent: Dec. 1, 1992

[54] AIR INTAKE SYSTEM FOR A FUEL-INJECTION ENGINE

[75] Inventors: Takao Fukuma; Hiroshi Okano, both of Tokyo, Japan

[73] Assignee: Toyota Jidosha Kabushiki Kaisha, Toyota, Japan

[21] Appl. No.: 860,674

[22] Filed: Mar. 30, 1992

[30] Foreign Application Priority Data

Dec. 6, 1991 [JP] Japan .................................. 3-322648

[51] Int. Cl.$^5$ ............................................. F02B 31/00
[52] U.S. Cl. ..................................... 123/308; 123/470; 123/432; 123/337
[58] Field of Search ............... 123/308, 432, 337, 470, 123/302

[56] References Cited

U.S. PATENT DOCUMENTS

| | | | |
|---|---|---|---|
| 4,553,507 | 11/1985 | Shaffer | 123/432 |
| 4,625,687 | 12/1986 | Hatamura | 123/308 |
| 4,719,886 | 1/1988 | Katani | 123/308 |
| 4,770,139 | 9/1988 | Tanaka | 123/308 |
| 4,805,569 | 2/1989 | Suzumura | 123/308 |
| 4,938,191 | 7/1990 | Oldani | 123/308 |

FOREIGN PATENT DOCUMENTS 60-219454 11/1985 Japan .
61-147336 9/1986 Japan .
62-152072 9/1987 Japan .

*Primary Examiner*—E. Rollins Cross
*Assistant Examiner*—Erick Solis
*Attorney, Agent, or Firm*—Oliff & Berridge

[57] ABSTRACT

An air intake system for a fuel injection engine having cylinders equipped with a swirl port and a conventional straight port. The air intake system comprises a swirl control valve for opening or closing the inlet air passage to the straight port, and further comprises an adapter piece installed in the division wall separating the inlet air passages into the swirl port and the straight port. An aperture communicating both inlet air passages is formed in the adapter piece, and the size thereof is optimized in consideration of the size of an air induction hole disposed in the swirl control valve, to thereby obtain a larger operation area of the air fuel ratio of the lean air fuel mixture supplied to the engine.

22 Claims, 10 Drawing Sheets

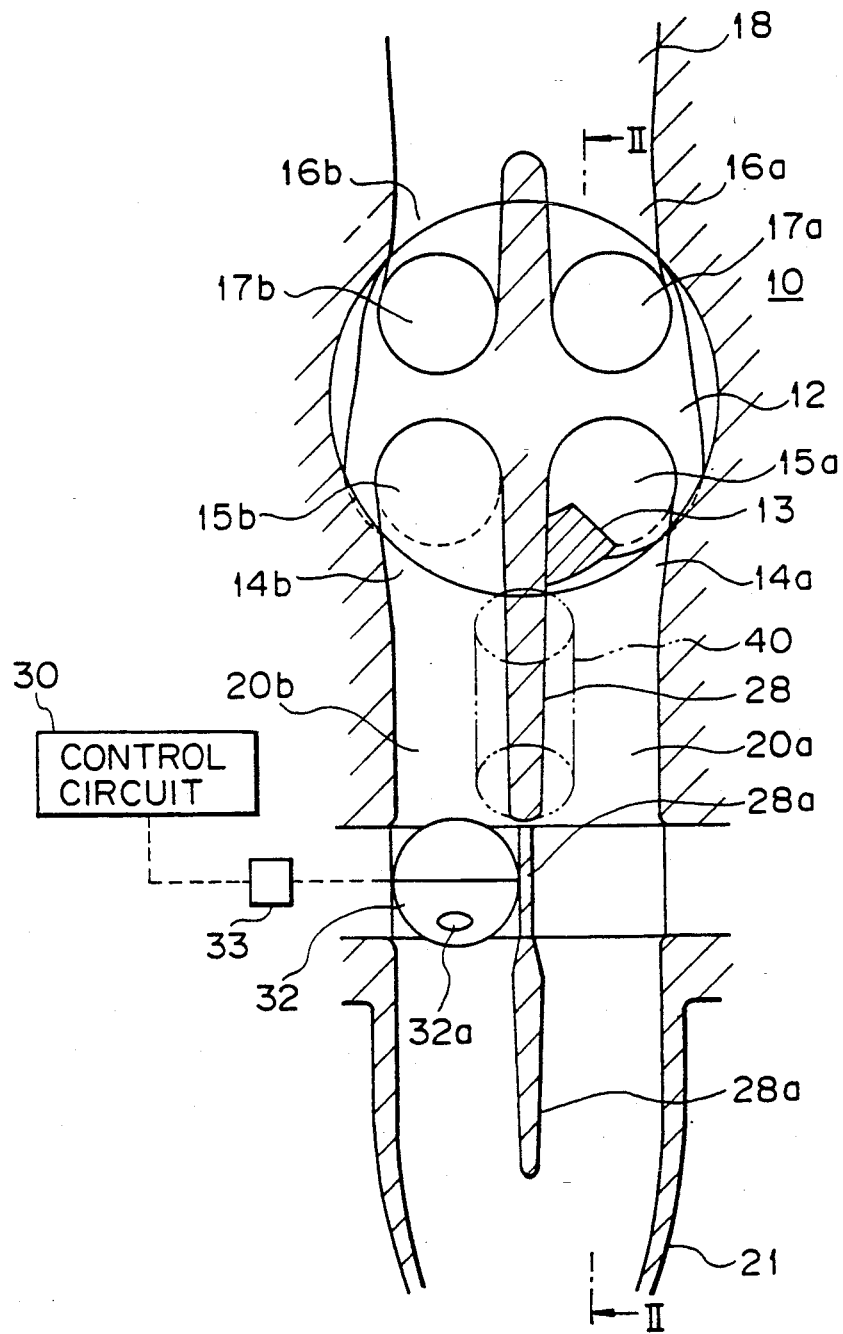

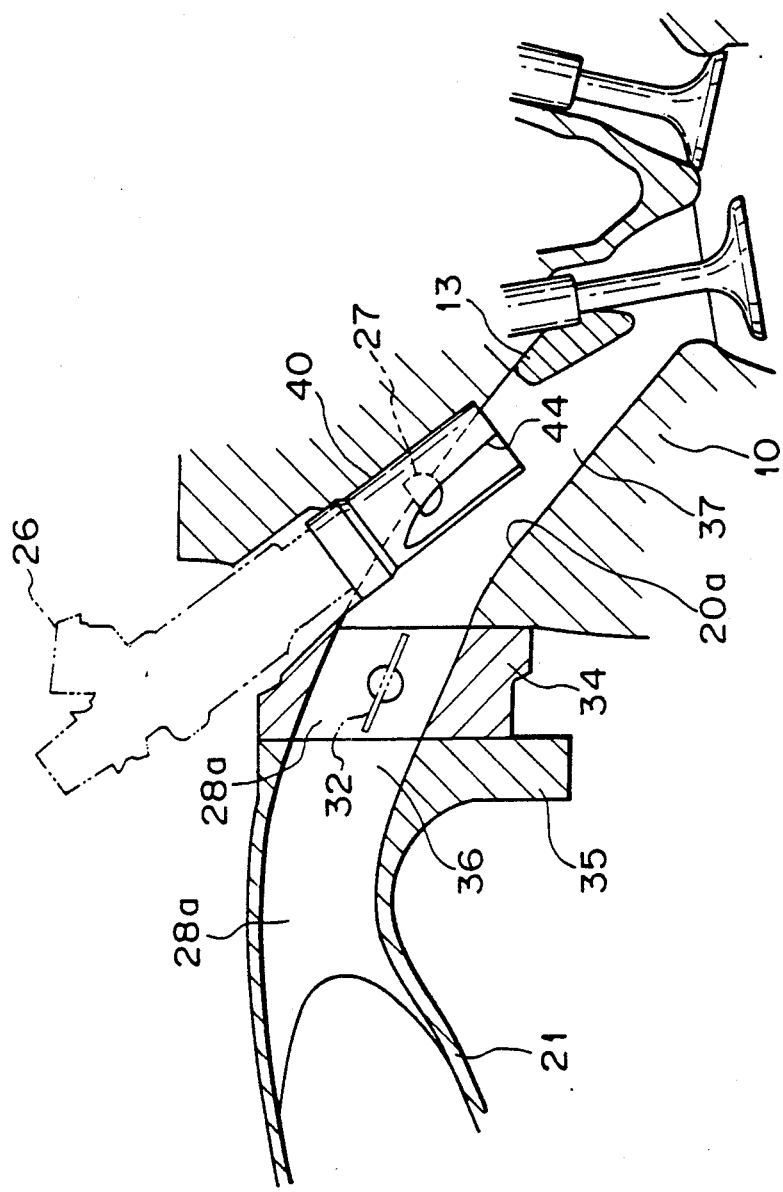

Fig. 3(a)
Fig. 3(b)
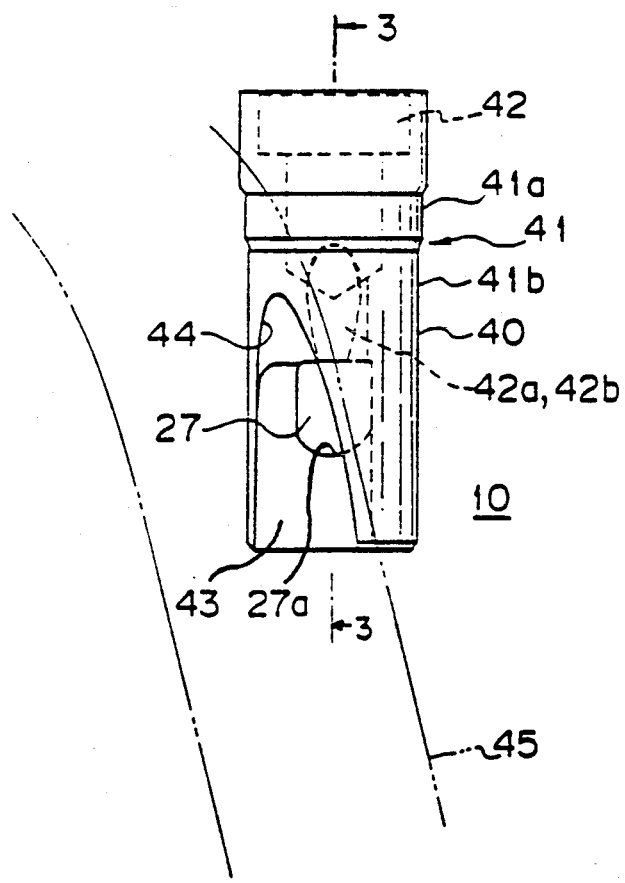
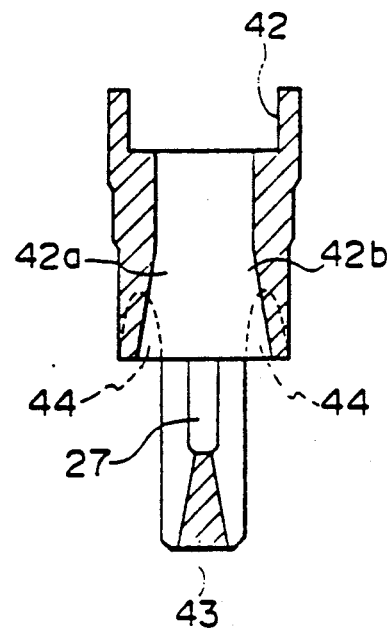

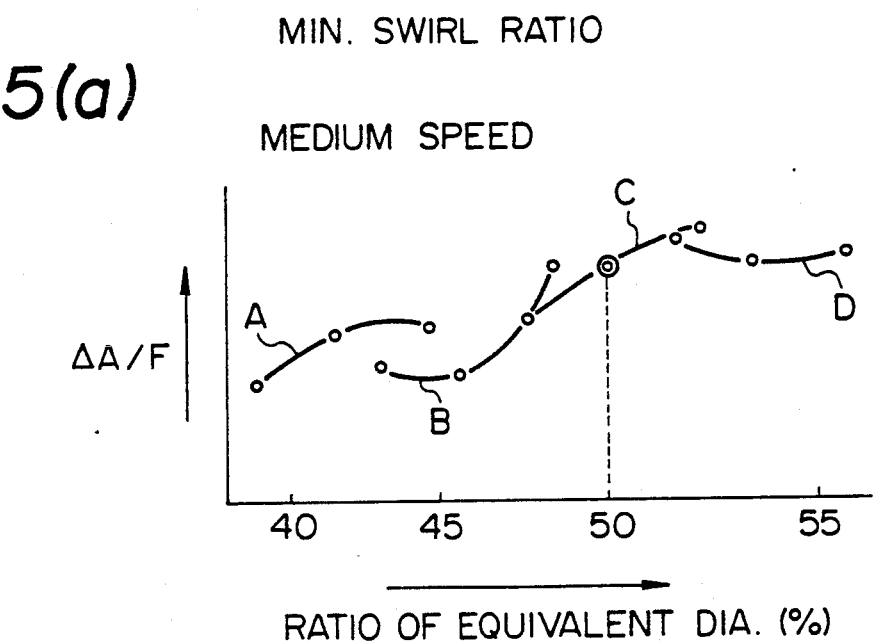
Fig. 5(a) MIN. SWIRL RATIO / MEDIUM SPEED
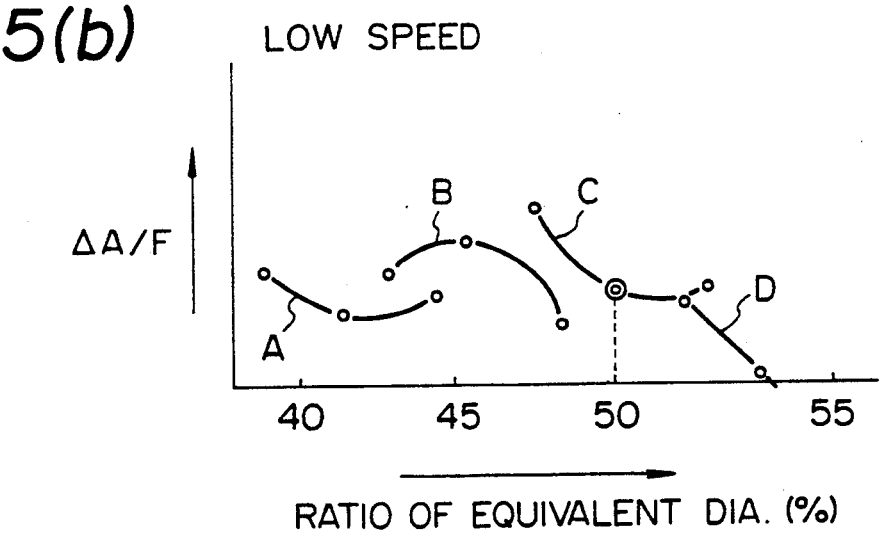
Fig. 5(b) LOW SPEED

AIR INTAKE SYSTEM FOR A FUEL-INJECTION ENGINE

BACKGROUND OF THE INVENTION

1. Field of the Invention

The present invention relates to an air intake system for a fuel injection engine wherein each engine cylinder is provided with a swirl inlet port and conventional straight inlet port.

2. Description of the Related Art

Engines operated on a lean air-fuel mixture having an air-fuel ratio higher than a stoichiometric ratio in the main operating range are known as lean burn engines. These lean burn engines are usually operated on a lean air-fuel mixture and are switched to operation on a rich air-fuel mixture when and acceleration or a high load operation is required.

Some learn burn engines are also equipped with swirl control valves, to thereby obtain a better combustion of the learn air-fuel mixture, and usually, these engines are provided with two inlet air passages for each engine cylinder; one leading to a swirl inlet port of the cylinder, which generates a swirl of the inlet air therethrough in the cylinder, and the other leading to conventional low pressure drop straight type inlet port.

The swirl control valve is provided in the inlet air passage of the straight port, for blocking the air passage in accordance with the load condition of the engine. For example, when the engine is operated at a low speed and low load, the swirl control valve is closed to block the inlet air passage to the straight port, and the amount of fuel injected and the ignition timing are adjusted to obtain a lean air-fuel mixture operation. When the air passage to the straight port is blocked, the major portion of the inlet air to the engine flows into the engine cylinder through the swirl inlet port, and thus a strong swirl of an air-fuel mixture is generated within the cylinder, and therefore, a stable combustion can be obtained with a lean air-fuel mixture.

When the engine is operated at a high load, high speed condition, the swirl control valve is opened to allow inlet air into the cylinder through the low pressure drop straight port, and the amount of fuel injected and the ignition timing are adjusted to obtain a rich (or stoichiometric) air-fuel ratio mixture. Accordingly, the engine output is increased due to the increased inlet air flow and richer air-fuel ratio.

In the engines equipped with swirl control valves, to widen the lean air-fuel ratio operation limits and improve the response of the engine, generally the most effective results are obtained by injecting fuel to both the swirl port and the straight port.

This type of the engine is disclosed, for example, by Japanese Unexamined Patent Publication No. 60-219454. In this engine, a fuel injection valve is installed on the respective division wall separating the inlet air passages into a swirl port and a straight port. The fuel injector is provided with two nozzles for injecting the fuel to the swirl port and the straight port, respectively, and a swirl control valve is disposed in the respective inlet air passages leading to the straight port, at a position upstream of the fuel injection nozzles.

In this type of engine, when the swirl control valve is opened, the fuel injected to the inlet air passage to the straight port is atomized by the inlet air flow through the inlet air passage.

When the swirl control valve is closed, however, the inlet air passage to the straight port is blocked, and accordingly, there is no inlet air flow for atomizing the injected fuel in the inlet air passage to the straight port. Consequently, the fuel injected to the straight port flows into the engine cylinder in an insufficiently atomized state. After combustion, these relatively large particles of fuel cause an increase in the amount of the NOx component of the exhaust gas from the engine.

To solve this problem, in the engine disclosed by above Patent Publication No. 60-219454, an air induction hole is provided in the valve element of the swirl control valve, and accordingly, when the swirl control valve is closed a small amount of air still flows into the inlet air passage leading to the straight port, through the air induction hole, and thus the fuel injected to the straight port is atomized to a certain extent by the air flow through the air induction hole.

Also, it is known that, the provision of an aperture in the division wall by which a communication is obtained between the inlet passages and the swirl port and straight port effectively improves the atomization of the fuel injected to the straight port. This aperture is disposed near the outlet of the fuel injection nozzles, and when the swirl control valve is closed, a portion of inlet air flows therethrough from the swirl port side to the straight port side, and thus the atomization of the fuel injected to the straight port is improved by this air flow.

Generally, in a lean burn operation of the engine, the amount of NOx in the exhaust gas is increased when the air-fuel ratio of the air-fuel mixture supplied to the engine is lowered (i.e., approaches the stoichiometric air-fuel ratio), and fluctuations of the engine output torque are increased when the air-fuel ratio is increased. Therefore, the air-fuel ratio (A/F) of the air-fuel mixture for a lean burn operation of the engine must be set between the lower limit (A/F) min, which gives the maximum allowable NOx emission, and the higher limit (A/F) max, which gives the maximum allowable fluctuation of the output torque of the engine. Namely, the difference between the (A/F) max and the (A/F) min defines the range of the air-fuel ratio for an allowable lean burn operation of the engine (in this specification this range, (A/F) max−(A/F) min, is called the "available area of A/F", or simply "ΔA/F").

Considering variations in the engine operating conditions or deviations in the performance of individual engines due to manufacturing tolerances, preferably the available area of A/F or ΔA/F is made as large as possible.

It has been found, however, that the available area of A/F, or ΔA/F is greatly affected by the location and size of the air induction hole of the swirl control valve, and or the size of the aperture in the division wall.

FIG. 10 illustrates a typical arrangement of the swirl control valve and the fuel injector of lean burn engines. Referring to FIG. 10, a typical inlet air passage 114 has on curved portion 116 and a straight portion 118 connecting the curved portion 116 and a swirl port 123 of an engine cylinder 125. A swirl control valve 110 is usually disposed upstream of the curved portion 116, and fuel is injected from a nozzle 119 of a fuel injector located downstream of the swirl control valve 110. In this case, if the air induction hole of the swirl control valve 110 is provided near the inner wall of the curved portion 116 of the inlet air passage 114 (near to the wall having a smaller radius of curvature, i.e., the lower half of the valve element in FIG. 10), the air 120 from the air induction hole passes straight through the curved portion 116 and impinges on the outer wall of the curved portion 116 (i.e., the wall of the curved portion having a larger radius of curvature). Consequently, the injected fuel 112 is carried by this air flow 120 and impinges on the wall and is adhered thereto. The fuel adhered to the wall flows along the wall and enters the cylinder as a drop of liquid, and as mentioned before, this causes an increase in the amount of NOx in the exhaust gas, and thus the available area of A/F is reduced. Also, when the size of the air induction hole is large, the atomization of the injected fuel is improved due to the increased air flow through the air induction hole, but if the size of the air induction hole is too large, the amount of inlet air flowing into the cylinder through the swirl port is reduced and the swirl generated in the cylinder becomes unsatisfactorily weak. This also reduces the available area of A/F due to an insufficient mixing of the air-fuel mixture in the cylinder. Therefore, the position and size of the air induction hole are very important to the obtaining of a larger available area of A/F. Nevertheless, Japanese Unexamined Patent Publication No. 60-219454 does not teach the position and size of the air induction hole.

Further, if the aperture of the division wall is provided in addition to the air induction hole, the size of the air induction hole must be determined in conjunction with the size of the aperture.

As explained before, the atomization of the fuel injected to the straight port is effectively improved by providing an aperture in the division wall, but the size of the aperture is also an important factor in the obtaining of a larger available area of A/F. If the size of the aperture is small, the amount of the air flowing through the aperture is also small and accordingly, the fuel injected to the straight port is not sufficiently atomized, and thus the amount of NOx in the exhaust gas is increased, and the available area of A/F is reduced. Conversely, if the size of the aperture is too large, the amount of inlet air flowing into the cylinder through the swirl port is reduced, because the amount of air flowing into the cylinder through the aperture and the straight port is increased. This is a cause of an insufficient swirl in the cylinder and results in a reduction of the available area of A/F.

FIG. 8 illustrates a general relationship between the available area of A/F ($\Delta$A/F) and the area S of the aperture in the division wall. In FIG. 8, the solid line shows the change in $\Delta$A/F when the air induction hole is provided in the swirl control valve, and the dotted line shows the change in A/F when the air induction hole is not provided in the swirl control valve.

As seen from the figure, in both cases an optimum value of the area of the aperture giving a largest value of $\Delta$A/F exists, and therefore, preferably the size of the aperture is as close as possible to that optimum value. Also, as seen from FIG. 8, the $\Delta$A/F is increased when the air induction hole is provided in the swirl control valve. Namely, if the air induction hole is appropriately positioned, the air flowing there through not only improves the atomization of the injected fuel but also prevents the carrying of the injected fuel by the air flow through the aperture, which fuel will adhere to the wall of the inlet passage opposite the aperture.

As explained above, the size of the aperture in the division wall and the size of the air induction hole of the swirl control valve must be determined to be such that the maximum available area of the A/F is obtained, but usually it is difficult to obtain a desired size of the aperture in the division wall.

Generally, the intake manifold of the engine is produced by casting. Consequently, if an aperture must be formed in the division wall, it is usually formed by the use of a core during the casting, or alternatively, it is obtained by machining, for example, by drilling a hole in the cast inlet manifold. If the core is used for forming the aperture, the portion of the core forming the aperture is supported between the core forming two inlet passages of the inlet manifold, and the cross-section of the portion of the core forming the aperture must be large enough to prevent a breakage of that portion during the casting. Consequently, the size of the aperture formed by the part also becomes large; usually larger than the desired size. Namely when the aperture is formed by casting, it is difficult to obtain the optimum size of the aperture.

Alternating, as mentioned above, the aperture can be formed by drilling after the inlet manifold is cast. In this case, as shown in FIG. 9, the drill 103 must be inserted from outside of the inlet manifold 109, through a hole 101 in which the fuel injector is installed, to form the aperture 107 on the division wall 105, but due to the limited space for machining, the drilling angle $\theta$ shown in the figure is not large enough, and consequently, usually it is difficult to obtain an aperture having the optimum size or shape by drilling. Further, if a drilling procedure is used to machine the aperture 107, a relatively long drill is required, and this lowers the accuracy of the machining due to fluctuations of the drill chip, and causes a flash on the edge 105a of the aperture 107.

SUMMARY OF THE INVENTION

Therefore, in new of the problems of the related art, one object of the present invention is to increase the available area of A/F by optimizing the position and size of the air induction hole of the swirl control valve. Another object of the invention is to increase the available area of A/F by optimizing the size of the aperture of the division wall in conjunction with the size of the air induction hole of the swirl control valve.

Still another object of the present invention is to provide a means for producing an aperture of a desired size and shape, without encountering the problems described previously. Therefore, according to one aspect of the present invention, there is provided an air intake system for an engine having cylinders each equipped with a swirl port and a straight port, comprising a first inlet air passage connected to the swirl port; a second inlet air passage connected to the straight port; a division wall formed between, and separating the first and second inlet air passages of the respective cylinders; a swirl control valve installed in said second inlet air passage; a fuel injector disposed between the first and the second inlet passages of the respective cylinders and injecting fuel into both of the first and second inlet air passages; and an adaptor piece installed on the respective division wall downstream of the swirl control valve and having a portion forming a part of the division wall, the adaptor piece having an installation seat for receiving the fuel injector and a fuel injection passage formed in the division wall, through which the fuel is injected into both inlet air passages, an aperture formed in the portion of the adaptor piece forming a part of the division wall, at a position immediately downstream of the fuel injection passage, and communicating the first and second inlet air passages.

According to another aspect of the present invention, an air induction hole is provided in the valve element of the swirl control valve, at a position in the upper half side of the valve element.

Also, according to another aspect of the present invention, both the aperture in the division wall and the air induction hole in the swirl control valve are provided, and the total area of the aperture and the air induction hole is set at approximately 25% of the area of the cross section of the inlet air passage to the straight port.

BRIEF DESCRIPTION OF THE DRAWINGS

The present invention will be better understood from the description of a preferred embodiment thereof, as set forth hereafter, with reference to the accompanying drawings, in which;

FIG. 1 is a schematically illustrated view of an embodiment of the air intake system according to the present invention;

FIG. 2 is a cross sectional view taken along the line II—II in FIG. 1;

FIG. 3b shows details of the adaptor piece shown in FIG. 1;

FIG. 5 to FIG. 7 illustrate the relationships between the sizes of the aperture in the division wall, the size of the air induction hole and the available area of A/F, under the conditions in which the swirl ratio is despersed within the manufacturing tolerances;

DESCRIPTION OF A PREFERRED EMBODIMENT

Figure 4A:
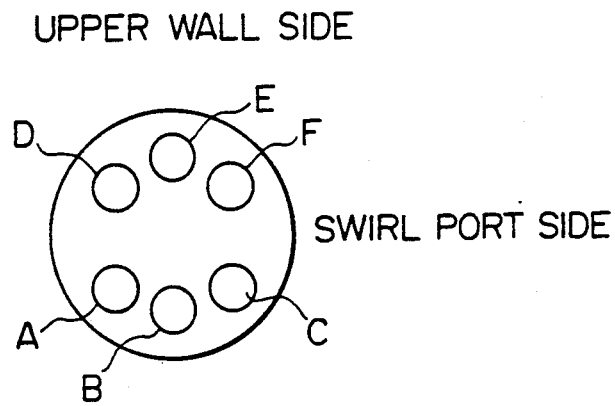
FIG. 4b illustrates the relationship between the position of the air induction hole in the swirl control valve and the available area of A/F.

FIGS. 1 and 2 schematically illustrate an embodiment of the air intake system according to the present invention.

Referring to FIG. 1, reference numeral 10 represents a cylinder head of an engine, and 12 is a cylinder bore. In this embodiment, although a multi-cylinder engine is described only one cylinder thereof is shown in the figure.

As shown in the figure, each cylinder of the engine is provided with two intake ports 14a, 14b and two exhaust ports 16a, 16b.

Inlet valves 15a, 15b and exhaust valves 17a, 17b are provided at the respective ports, 14a, 14b and 16a, 16b, and the exhaust ports 16a, 16b are connected to an exhaust manifold 18.

The first inlet port 14a is formed as a helical port, i.e., in this embodiment, a projection 13 is provided on the wall of the inlet port 14a to deflect inlet air flowing therethrough, to thereby generate a swirl in the cylinder. The second inlet port 14b is formed as a conventional straight type inlet port.

Two separate inlet air passages 20a and 20b, separated by a division wall 28 and connected to the swirl port 14a and the straight port 14b, respectively, are formed in the cylinder head 10. The inlet air passages 20a and 20b are connected to a surge tank (not shown) by an intake pipe 21 installed an the cylinder head. Also a division wall 28a is provided within the intake air pipe 21 in such a manner that the inlet air passages 20a and 20b are separately extended through the intake air pipe 21.

An aperture 27 (FIG. 2) communicating the inlet air passages 20a and 20b is provided in the division wall 28 at a position near to the inlet ports of the cylinder 12. A fuel injector 26 (FIG. 2) is installed in the cylinder head 10 at a position between the inlet air passages 20a and 20b. The fuel injector 26 is provided with two injection nozzles opening to the respective inlet air passages 20a and 20b at a position near to the aperture 27, and injection fuel in to the swirl port 14a and the straight port 14b.

A swirl control valve 32 is provided in the inlet air passage 20b leading to the straight port 14b. This swirl control valve 32 comprises a plate type valve element that is in either the open or closed position. When the swirl control valve 32 is in the closed position, the inlet air passage 20b is blocked, and accordingly, a major portion of the inlet air flows into the engine cylinder through the inlet air passage 20a and the swirl port 14a. Therefore, the inlet air flowing into the cylinder 12 forms a strong swirl in the cylinder, and thus a stable combustion of the lean air-fuel mixture can be obtained. In this embodiment, an air induction hole 32a, as explained later, is provided in the valve element of the swirl control valve 32, whereby an amount of the inlet air is allowed to flow through the inlet air passage 20b even when the swirl control valve 32 is closed.

Reference numeral 30 in FIG. 1 represents a control circuit for controlling the swirl control valve 32. The control circuit 30 detects the operating condition of the engine, and when the engine is operated under predetermined conditions such as a low load and a low speed, drives an actuator 33 to close the swirl control valve 32. Any appropriate type of actuator, such as a diaphragm type actuator or a solenoid actuator, can be used as the actuator 33.

FIG. 2 shows a cross section taken along the line II—II in FIG. 1.

As shown in FIG. 2, a inlet manifold 35, which comprises intake air pipes 21 to the respective cylinders 12, is installed of the cylinder head 10, and the valve bodies 34 of the swirl control valves 32 are held between the inlet manifold 35 and the cylinder head 10. As mentioned above, a division wall 28a, which connects with the division wall 28, is provided in the valve body 34 and intake air pipe 21, whereby separate inlet air passages 20a and 20b are also formed in the valve body 34 and intake air pipe 21.

The intake air pipe 21 is curved, to facilitate the connection between the surge tank (not shown) and the cylinder head 10. Accordingly, the inlet air passages 20a and 20b comprise a curved portion 36 in the intake air pipe 21 upstream of and including the valve body 34, and downstream of the valve body 34 extend straight in the cylinder head 10 to the inlet ports 14a, 14b, to thus form the straight portion 37 of the inlet air passages 20a and 20b.

In this embodiment, the aperture 27 in the division wall 28 is disposed in the straight portion 37 of the inlet air passages 20a, 20b. The fuel from the fuel injector 26 is also injected from a position immediately upstream of the aperture 27, and is directed to the back side of the inlet valves 15a and 15b. The fuel is injected from the straight portion 37 because, if the fuel is injected from the curved portion 36, the direction of the injection is influenced by the air flow deflected through the curved portion 36.

As best shown in FIG. 2 and FIG. 3, the aperture 27 is disposed at a height such that a plane (indicated by a dotted line in FIG. 2 and 3) tangential to the top of the upper wall surfaces of the straight portions 37 of the passages 20a and 20b intersects the aperture 27. (In this specification, "upper wall" means the wall connected with the outer wall of the curved portion 37 having a larger radius of curvature.)

To ensure a better atomization of the injected fuel, the fuel must be injected from the position immediately upstream of the aperture 27. Therefore, if the aperture 27 is located at position lower than that the height of the fuel injection point also must be lowered. This is not preferable because the influence of the inlet air flow on the injected fuel is increased by this arrangement, and causes a deflection of the injected fuel by the inlet air flow.

Conversely, if the aperture 27 is located at a position higher than the height of the upper walls, a relatively large cavity must be formed in the upper wall of the inlet air passages, to accommodate the aperture. This cavity will cause turbulence in the inlet air flowing along the upper wall of the inlet air passages, and thus will increase the pressure drop in the inlet air flow.

Therefore, in this embodiment, the aperture is located at the height explained above, to minimize any influence on both the injected fuel and the inlet air flow.

In this embodiment as shown in FIG. 2, the aperture 27 and the passage for injected fuel are not directly formed by the division wall but are formed in a separate adaptor piece 40. The adaptor piece 40 is installed in the cylinder head 10 by press fitting same into the installation hole provided in the cylinder head, such that the aperture 27 in the adaptor piece 40 is located at a predetermined position relative to the inlet air passages 20a, 20b.

FIG. 3 shows details of the adaptor piece 40, wherein FIG. 3(a) is an enlarged view of the adaptor piece 40 seen from same direction as FIG. 2, and FIG. 3(b) shows a cross section taken along the line 3—3 of FIG. 3(a).

The adaptor piece 40 has a generally cylindrical shape with a stepped diameter portion 41 comprising a larger diameter portion 41a and a smaller diameter portion 41b on the outer surface thereof. The adaptor piece 40 is mounted in the cylinder head 10 by a press-fit between the larger diameter portion 41a and the wall of the installation hole (not shown) of the cylinder head 10. The end of the adaptor piece 40 located outside of the cylinder head 10 when installed comprises an installation seat 42 for receiving the fuel injector 26. The other end of the adaptor piece, located inside the cylinder head 10 when installed, has a hollow cylindrical shape having a center division wall 43 extending along the axis of the adaptor 40 and formed inside thereof. When the adaptor piece 40 is installed in place, the division wall 43 is connected with the division wall 28 of the inlet passages 20a and 20b, to thus form a continuous division wall. Part of the side wall of the adaptor piece 40 is cut away to form openings 44 matching the shape of wall surfaces of the inlet air passages, so that the side wall does not protrude into the inlet air passages 20a and 20b. Through the installation seat 42 and the fuel injection passages 42a, 42b formed in the adapter piece 40, is injected the fuel from two nozzles of the injector 26, to both inlet port 14a, 14b.

The aperture 27 is formed in the center division wall 43 at a position immediately downstream of the outlets of the fuel injection passages 42a, 42b opening to the inlet air passages 20a, 20b.

As shown in FIG. 3(a) the aperture 27 is formed at the position such that a plane tangential to the top surfaces of the upper wall of the inlet air passages intersects the aperture 27.

The shape of aperture 27 in this embodiment is composed of a combination of a rectangular-shaped portion located upstream and a semicircular portion 27a located downstream thereof. The semicircular edge 27a of the aperture prevents a turbulence in the air flow therethrough. Also, since this portion has a semicircular shape, corners in which the fuel may accumulate are avoided.

The adaptor piece 40 in this embodiment is made by casting an aluminum alloy. In this embodiment, since the adaptor piece 40 is cast separately from the inlet manifold, a die casting process can be used. Therefore, the desired size and the shape of the aperture 27 can be obtained without a limitation imposed by the strength of the core used in the conventional casting process. Also, by using a die casting process in which a higher casting accuracy is obtained, the size and shape of the aperture, which are important factors in the engine performance, are maintained within precise manufacturing tolerances. The fuel injection passages 42a and 42b of the adaptor piece 40 are formed by drilling from the division wall 43 side of the adaptor piece 40. In this case also, the direction of the fuel injection passages can be determined without limitations imposed by the available space for matching, and the accuracy of the drilling is increased because the size of the workpiece is small. The adaptor piece 40 is pressed into the installation hole in the cylinder head 10 after determining the direction of rotation around the axis until the tip of the division wall 43 abuts against the remaining portion of the division wall 28 of the inlet passages 20a, 20b, so that a continuous division wall is formed by division walls 43 and 28. When in position, the adaptor piece 40 is secured to the cylinder head 10 by the press fit between the larger diameter portion 41a of the adaptor piece 40 and the wall of the installation hole, and annular gap is formed between the surface of the smaller diameter portion 41b and the wall of the installation hole. Since the adaptor piece 40 is in contact with the cylinder head 10 only at the larger diameter portion 41a and the tip of the division wall 43, the amount of heat conducted from the cylinder head 10 to the adaptor piece 40 is reduced due to this smaller contacting surface area between the cylinder head 10 and the adaptor 40. This prevents an excessive rise in the temperature of the fuel injector 26, and associated problems such as a difficulty in starting the engine at a high engine temperature due to a vaporizing of the fuel in the fuel injector.

Further, if an air assist fuel injection system in which atomizing air is supplied to the fuel injection passages 42a, 42b is adopted, a passage for the assist air can be formed between the contacting surfaces of the larger diameter portion 41a and the wall of the installation hole, and thus the usual piping required for the assist air can be simplified.

Another advantage of the adaptor piece 40 is that the size and the shape of the aperture can be easily changed merely by changing the adaptor piece. Consequently, when adjusting the engine according to the type of the vehicle or its usage, it is not necessary to change the whole inlet manifold to obtain different sizes and shapes of the aperture 27. The air induction hole 32a of the swirl control valve 32 is how explained.

As explained before, the position of the air induction hole 32a in the valve element of the swirl control valve has a large influence on the amount of the injected fuel adhered to the wall. FIG. 4(b) shows a general relationship between the position of the air induction hole and the available area of A/F, obtained by experiments. The vertical axis of the FIG. 4(b) represents the $\Delta A/F$ (available area of A/F), and the horizontal axis represents the position of the air induction hole shown in FIG. 4(a).

Figure 4B:
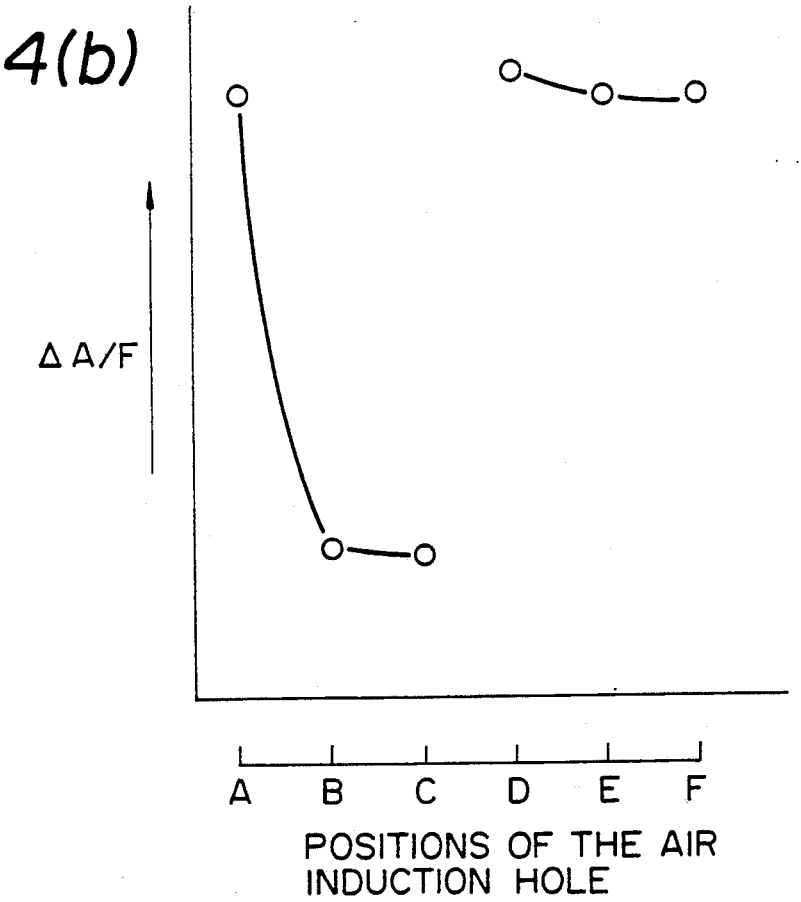

As shown in FIG. 4(a), the air induction holes A-C are located at the lower half (between the lower wall of the inlet passage 20b and a horizontal line passing through the center of the valve element) of the valve element, and the air induction holes D-F are located at the upper half of the valve element.

The influence of the position of the air induction hole on the available area of A/F varies according to the type of engine and operating conditions, and it should be understood that FIG. 4(b) shows only a typical relationship therebetween.

Figure 10:
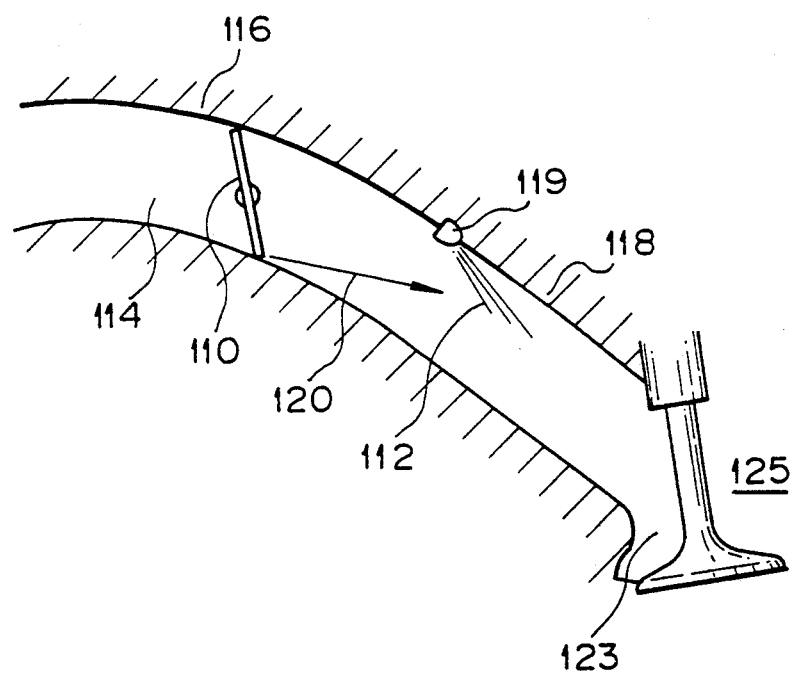

As shown in FIG. 4(b), when the air induction hole 32a is located at the lower half of the valve element, the $\Delta A/F$ is greatly worsened. This is because, as explained by FIG. 10, when the air is introduced from the lower part of the valve element, the injected fuel is deflected by the air flow, and thus the amount of the fuel adhered to the wall is increased. Therefore, it will be understood that it is necessary to dispose the air induction hole at the upper half of the valve element, to thereby increase the available area of A/F. In this embodiment, the air induction hole 32a is disposed immediately above the center of the valve element (the position E in FIG. 4(a)), to thus maintain a symmetrical arrangement of the valve element. Since, in an actual engine, the swirl port and straight port are usually disposed in a reverse manner in adjacent cylinders, it is preferable to maintain a dymmetry of the valve element so that the same valve element can be used for all of the cylinders. Further, considering the machining of the hole and the possibility of plugging during the operation of the engine, a single hole having a relatively larger size is preferred to a plurality of smaller size holes. Therefore, in this embodiment, a single air induction hole is adopted.

The optimization of the sizes of the aperture 27 and the air induction hole 32a is now explained.

As explained before, when the amount of air flowing through the aperture 27 and the air induction hole 32a is increased, the amount of fuel adhered to the wall of the inlet air passage 20b is reduced, but conversely, this causes a reduction of the swirl in the cylinder due to a drop in the amount air flowing through the swirl port. Therefore, the sizes of the aperture 27 and the air induction hole 32a must not be considered separately but must be optimized as a total area.

Further, the strength of the swirl (i.e., the swirl ratio defined as a number of rotations of the inlet air swirl that occurs in the cylinder during one revolution of the crankshaft of the engine.) varies to some extent in each individual engine, within the manufacturing tolerances of the cylinder head of the engine. Therefore, the optimum total area of the aperture 27 and the air induction hole 32a must be determined so that the available area of A/F is not greatly reduced even if the swirl ratio of the cylinder varies within the manufacturing tolerance.

Figure 6A:
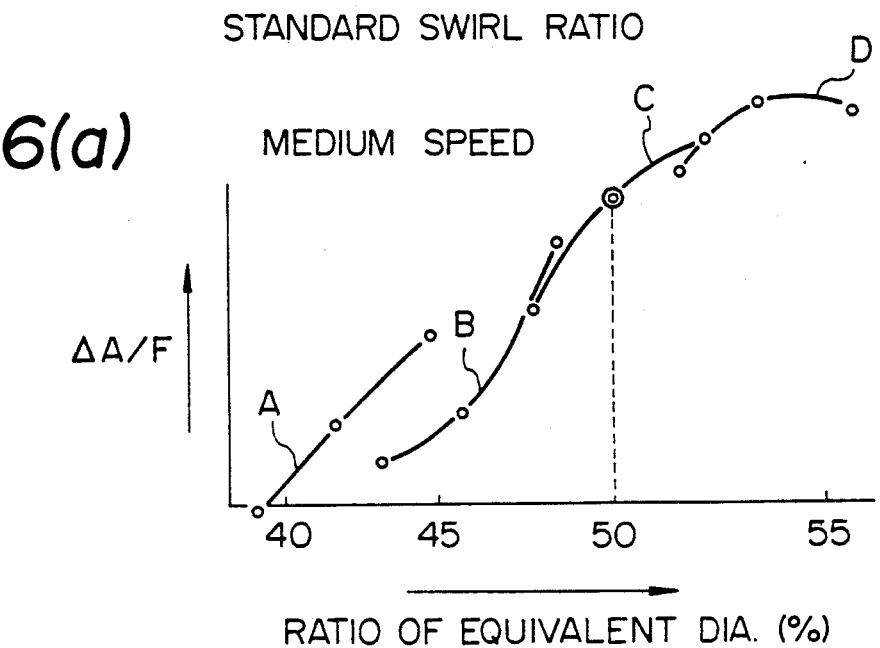
Figure 6B:
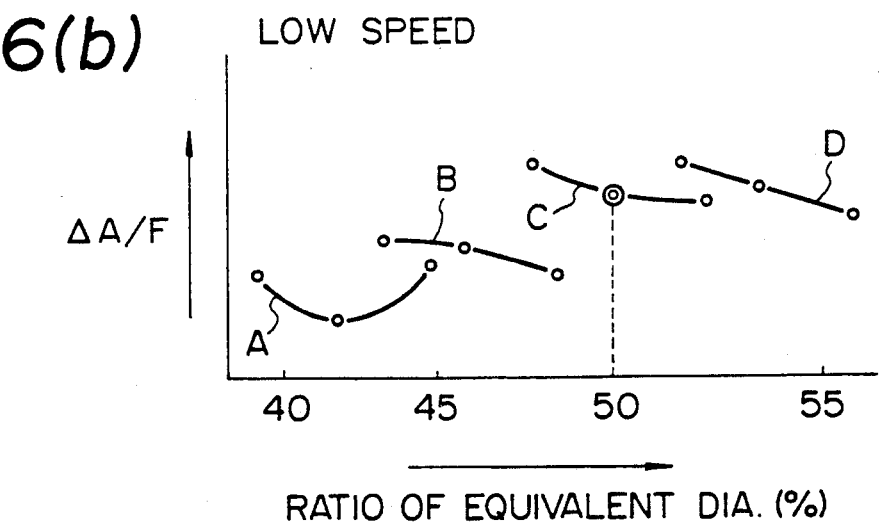

FIGS. 5 to 7 show the influence of the total area of the aperture 27 and the air induction hole 32a on the available area of A/F. In the figures, the vertical axis represents the $\Delta A/F$, or the available area of A/F, and the horizontal axis represents the ratio of the equivalent diameter of the total area of the aperture 27 and the air induction hole 32a, and the equivalent diameter of the inlet air passage 20b. (where, the equivalent diameter means a diameter d of a circle having an area that is the same as the subject area s, i.e., $d=(4s/\pi)^{\frac{1}{2}}$.)

Figure 7A:
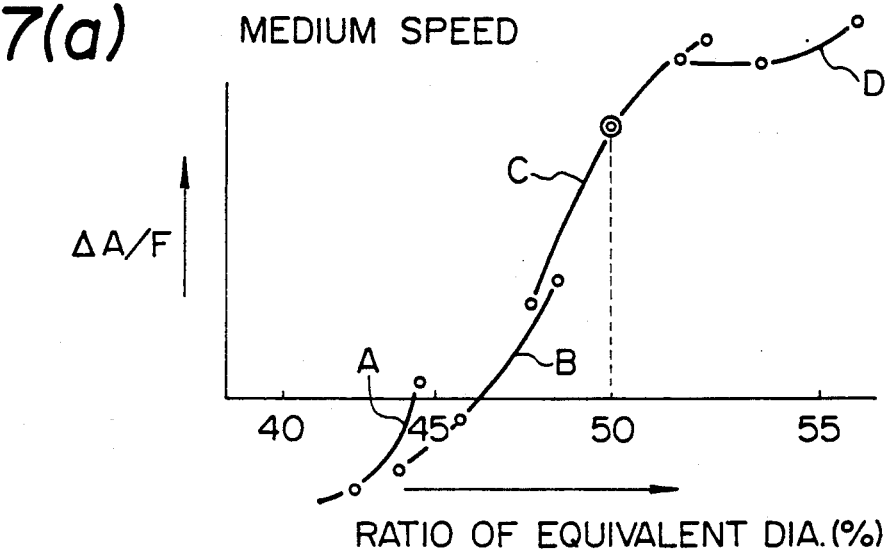
Figure 7B:
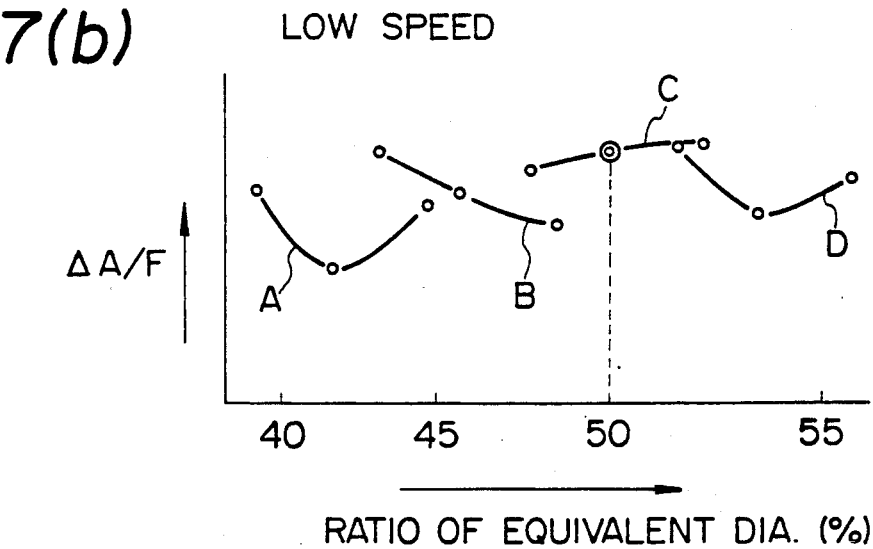
Figure 8:
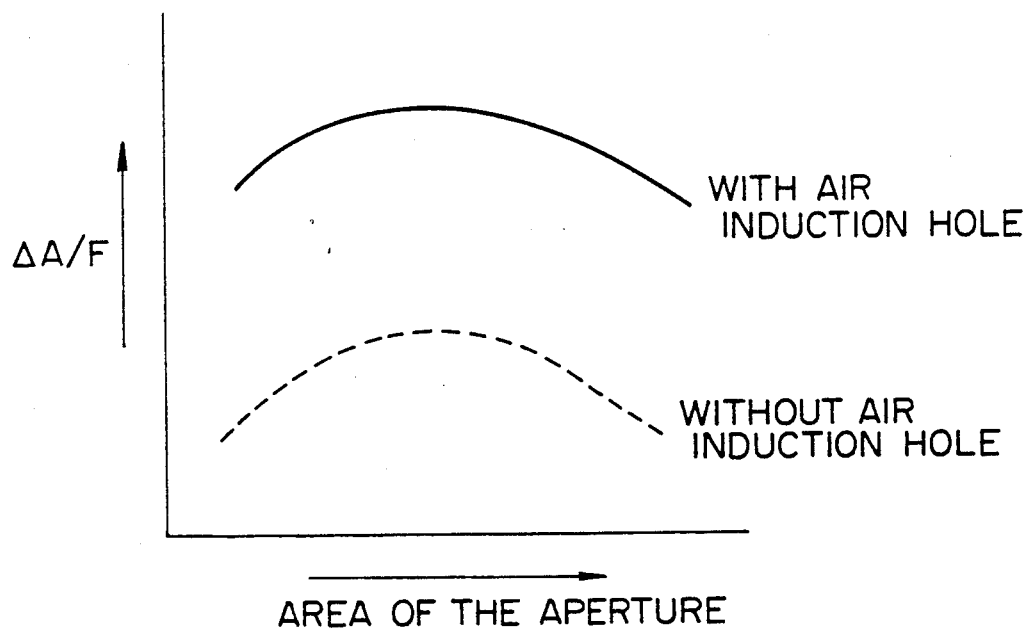
FIG. 8 is a typical drawing illustrating the relationship between the size of the aperture in the division wall and the available area of A/F, with and without the air induction hole of the swirl control valve.
Figure 9:
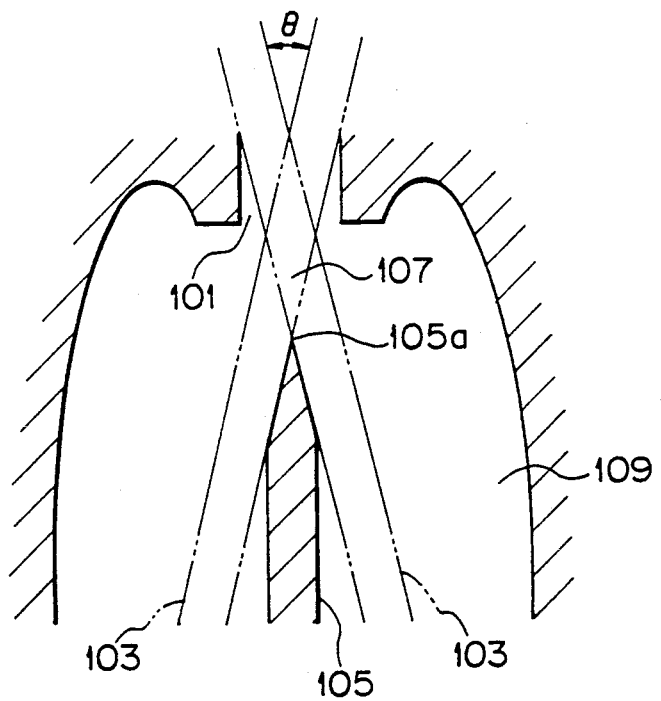
FIG. 9 is a schematic drawing showing the method of forming the aperture in the division wall by drilling; and, FIG. 10 is a drawing illustration the influence of the air flow from the air induction hole on the fuel injected from the fuel injector.

FIGS. 5 to 7 represent cases of a different swirl ratio, to thus show the influence of the variation of the swirl ratio. FIG. 6 shows the case of a standard value of the swirl ratio, and FIG. 5 and FIG. 7 show the case of the minimum swirl ration within the tolerance and the case of the maximum swirl ration within the tolerance, respectively. Also, the FIGS. 5(a) to 7(a) show the cases in which the engine is operated at a medium speed (such as 2500 rpm) with the swirl control valve closed, and the FIGS. 5(b) to 7(b) show the cases in which the engine is operated at a low speed (such as 1200 rpm) with the swirl control valve closed. The curves A-D in each figure show the case in which the area of the aperture is kept constant, and only the area of the air induction hole is changed. The curve A shows the case of the minimum aperture area, and the curve D shows the case of the maximum aperture area.

As seen from the figures, when the ratio of the equivalent diameters is larger than 50% (i.e., the total area of the aperture and the air induction hole is larger than approximately 25% of the area of the cross section of the inlet air passage 20b), the $\Delta A/F$ is greatly reduced in the case of a low speed operation with a minimum swirl ratio (FIG. 5(b), curve D). Conversely, when the ratio of the equivalent diameters is smaller than 50%, the $\Delta A/F$ is greatly reduced in the case of a medium speed operation with a maximum swirl ratio (FIG. 7(a), curves A, B). This is because, when the engine is operated at a low speed, the actual swirl ratio of the cylinder becomes low due to the reduced inlet air flow, and if the ratio of the equivalent diameter is increased in this speed range, the actual swirl is greatly reduced. As shown in FIG. 5(b), this tendency becomes remarkable when the lower swirl ratio cylinder head is used, since the actual swirl ratio is lower than other cylinder heads, even if the influence of the aperture or the air induction is not considered.

Conversely, if the higher swirl ratio cylinder head is used, the actual swirl is maintained at a desirable level even in the lower operation speed range. In this case, however if the ratio of the equivalent diameter is lowered the amount of fuel adhered to the wall of the inlet air passage 20b is increased in the medium speed range, due to a reduced inlet air flow through the inlet air passage 20b.

Therefore, considering the variation of he swirl ratio within the manufacturing tolerances, preferably the equivalent diameter of the total area of the aperture and the air induction hole is set at approximately 50% of the equivalent diameter of the cross sectional area of the inlet air passage 20b to the straight port (i.e., approximately 25% in the ratio of the areas). (FIGS. 5-7, Curves C).

Further considering the atomization of the fuel by the air flowing through the aperture, it is preferable to make the area of the aperture as large as possible. Therefore, in this embodiment, the ratio of the area of the air induction hole and the area of the aperture is set at approximately 2.5 to 3.

According to the present invention, the freedom of determining the size and shape of the aperture in the division wall, and the accuracy of machining the aperture is greatly increased by using an adapter piece and forming the aperture therein.

Also, according to the present invention, the position of the air induction hole of the swirl control valve and the size of the aperture in conjunction with the size of the air induction hole are optimized, to thus obtain a larger available area of A/F.

We claim:

1. An air int system for an engine having cylinders equipped with a conventional straight inlet port and a swirl inlet port generating a swirl in inlet air flowing therethrough in the cylinder, said system, comprising:
   a first inlet air passage connected to said swirl inlet port;
   a second inlet air passage connected to said straight inlet port;
   a division wall formed between and separating said first and second inlet air passages;
   a swirl control valve installed in said second inlet air passage, and blocking said second inlet air passages when the engine is operated at predetermined load condition, so that a major portion of the inlet air flows into the cylinder through the first inlet air passages and the swirl port;
   a fuel injector disposed between said first and second inlet air passages and injecting fuel into both of said first and second inlet air passages; and
   an adaptor piece installed in the division wall at a position downstream of the swirl control valve and having a portion thereof forming a part of said division wall, said adapter piece comprising an installation seat for receiving the fuel injector, fuel injection passages for injecting fuel therethrough to the first and second inlet air passages, and an aperture formed in said portion forming a part of the division wall at the outlet of said fuel injection passages, for communicating the first and the second inlet air passages.

2. An intake air system for an engine according to claim 1, wherein said adaptor piece has a generally cylindrical shape with a stepped diameter portion consisting of a larger diameter portion and a smaller diameter portion on the outer surface thereof, said adaptor piece being installed in said division wall by a press-fit of said larger diameter portion into an installation hole formed in the wall of the inlet air passages so that, when installed, an annular clearance is formed between the inner wall of the installation hole and the outer surface of said smaller diameter portion of the adaptor piece.

3. An air intake system for an engine according to claim 1, wherein said swirl control valve comprises a plate type valve element for opening and closing said second inlet air passage, and at least one air induction hole provided in said valve element for introducing a portion of inlet air to said second inlet air passage when the second inlet air passage is blocked by said valve element.

4. An air intake system for an engine according to claim 3, wherein said at least one air induction hole is disposed at the upper half side of the valve element of the swirl control valve.

5. An air intake system for an engine according to claim 4, wherein a single air induction hole is disposed at a position immediately above the center of the valve element of the swirl control valve.

6. An air intake system for an engine according to claim 3, wherein the total of the area of said air induction hole of the swirl control valve and the area of said aperture of the adaptor piece communicating said first and second inlet air passages is approximately 25% of the area of the cross section of said second inlet air passage.

7. An air intake system for an engine according to claim 6, wherein the area of said aperture of the adaptor piece is larger than the area of said air induction hole of the swirl control valve.

8. An air intake system for an engine according to claim 7, wherein the area of said aperture of the adaptor piece is 2.5 to 3 times larger than the area of said air induction hole of the swirl control valve.

9. An air intake system for an engine according to claim 1, wherein said first and second inlet air passages are composed of a curved portion downstream of the swirl control valve, and a straight portion connecting said curved portion to the cylinder and said aperture of the adapter piece communicating the first and the second inlet air passages is located in the division wall of said straight portion of the inlet air passages.

10. An air intake system for an engine according to claim 9, wherein said aperture of the adapter piece is further disposed at a height such that a plane which is tangential to the top of the upper wall surfaces of the straight portions of the inlet air passages intersects the aperture.

11. An air intake system for an engine according to claim 1, wherein a part of said aperture of the adapter piece located at the downstream side has a semicircular shape.

12. An air intake system for an engine having cylinders equipped with a conventional straight inlet port and a swirl inlet port generating a swirl of the inlet air therethrough in the cylinder, said system comprising:
   a first inlet air passage connected to said swirl inlet port;
   a second inlet air passage connected to said straight inlet port;
   a division wall formed between, and separating said first and second inlet air passages;
   a swirl control valve having a plate type valve element and installed in said second inlet air passage and blocking said second inlet air passage when the engine is operated at predetermined load condition, so that a major portion of the inlet air flows into the cylinder through the first inlet air passage and the swirl port;
   a fuel injector disposed between said first and second inlet air passages for injecting fuel into both inlet air passages downstream of the swirl control valves, through fuel injection passages formed in the division wall;
   an aperture disposed in the division wall near to the outlets of the fuel injection passages, and communicating said first and second inlet air passages; and
   an air induction hole formed in said valve element of the swirl control valve for introducing a portion of the inlet air to said second inlet air passage when the second inlet air passage is blocked by said valve element, said air induction hole being disposed at the upper half side of the valve element of the swirl control valve.

13. An air intake system for an engine according to claim 12, wherein a single air induction hole is disposed in the valve element of the swirl control valve at a position immediately above the center of the valve element.

14. An air intake system for an engine according to claim 12, wherein the total of the area of said air induction hole of the swirl control valve and the area of said aperture of the division wall communicating the 25% of the area of the cross section of said second inlet air passage.

15. An air intake system for an engine according to claim 14, wherein the area of said aperture of the division wall is larger than the area of said air induction hole of the swirl control valve.

16. An air intake system for an engine according to claim 15, wherein the area of said aperture of the division wall is 2.5 to 3 times larger than the area of said air induction hole of the swirl control valve.

17. An air intake system for an engine having cylinders equipped with a conventional straight inlet port and a swirl inlet port generating a swirl of inlet air therethrough in the cylinder, said system comprising:
 a first inlet air passage connected to said swirl inlet port;
 a second inlet air passage connected to said straight inlet port;
 a division wall formed between, and separating said first and second inlet air passages;
 a swirl control valve having a plate type valve element and installed in said second inlet air passage and blocking said second inlet air passages when the engine is operated at predetermined load condition, so that a major portion of the inlet air flows into the cylinder through the first inlet air passages and the swirl port;
 a fuel injector disposed between said first and second inlet air passages for injecting fuel into both inlet air passages downstream of the swirl control valves through fuel injection passages formed in the division wall;
 an aperture disposed in the division wall near to the outlets of the fuel injection passages and communicating said first and second inlet air passages; and
 air induction hole formed in said valve element of the swirl control valve for introducing a portion of the inlet air to said second inlet air passage when the second inlet air passage is blocked by said valve element;
 and, a total of the area of said aperture of the division wall and the area of said air induction hole of the swirl control valve is approximately 25% of the area of the cross section of said second inlet air passage.

18. An air intake system for an engine according to claim 17, wherein said first and the second inlet air passages are composed of a curved portion downstream of the swirl control valve, and a straight portion connecting said curved portion to the swirl port, and said aperture communicating the first and the second inlet air passages is disposed in the division wall of said straight portions.

19. An air intake system for an engine according to claim 18, wherein said aperture of the division wall is further disposed at a height such that a plane which is tangential to the top of the upper wall surfaces of the straight portions of the inlet air passages intersects the aperture.

20. An air intake system for an engine according to claim 17, wherein the area of said aperture of the division wall is larger than the area of said air induction hole of the swirl control valve.

21. An air intake system for an engine according to claim 20, wherein the area of said aperture of the division wall is 2.5 to 3 times larger than the area of said air induction hole of the swirl control valve.

22. An air intake system for an engine according to claim 17, wherein a part of said aperture of the division wall located at the downstream side has a semicircular shape.

* * * * *